United States Patent Office 3,212,240
Patented Oct. 19, 1965

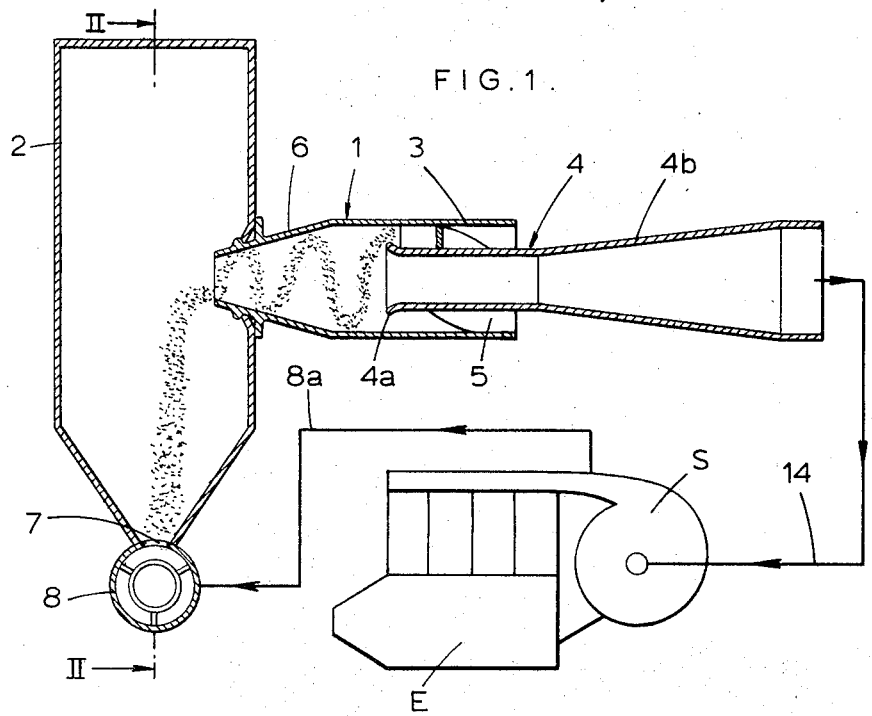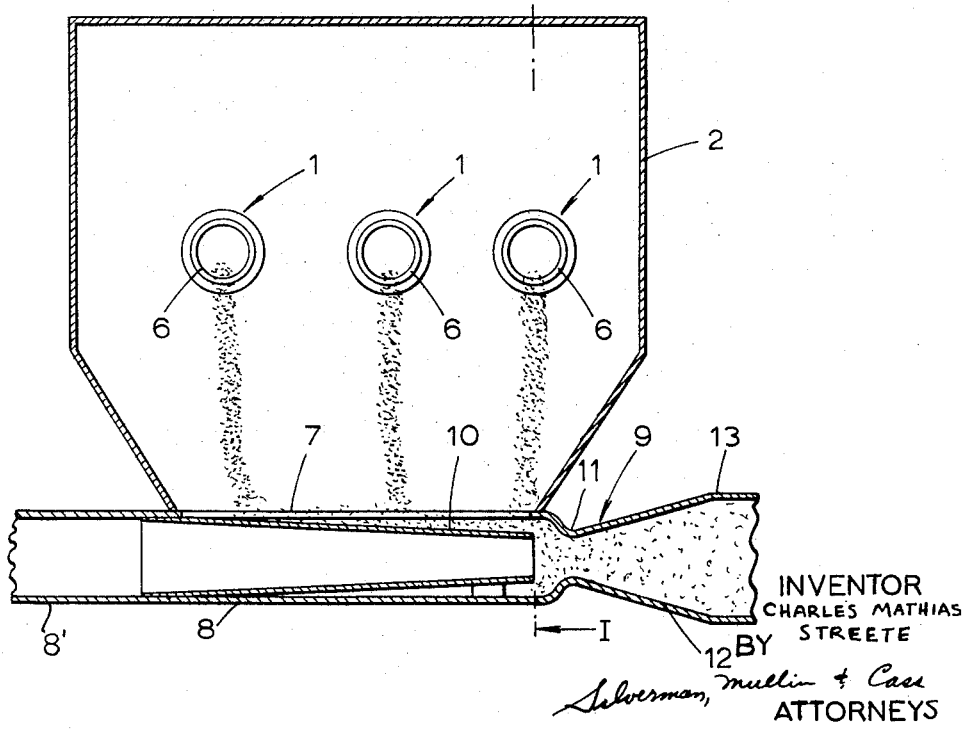

3,212,240
AIR CLEANING APPARATUS FOR INTERNAL COMBUSTION ENGINE
Charles Mathias Streete, Abergavenny, England, assignor to Coopers Mechanical Joints Limited, Abergavenny, England
Filed June 11, 1962, Ser. No. 201,595
Claims priority, application Great Britain June 21, 1961, 22,502/61
5 Claims. (Cl. 55—346)

This invention relates to the extraction of powder or granular material from hoppers and is particularly concerned with gas filters or dust extractors in which the extracted dust is collected in a hopper, as in the cyclone type gas filters for use in the air intakes of internal combustion engines.

The object of the invention is to provide convenient means for emptying a hopper or, at least, for preventing it from becoming too full.

According to the invention, a hopper for powder or granular material is provided with a gas operated ejector for removing the powder or granular material from the container. Conveniently the ejector may be arranged to act continuously during the operation of a filter or dust extractor. Thus, where the filter is used to supply clean air to a supercharged internal combustion engine, the ejector may be fed continuously with a stream of air bled from the high-pressure side of the supercharger.

Where the filter is a cyclone separator used to supply an internal combustion engine, the pressure in the hopper is depressed below atmospheric pressure by the engine, or supercharger, suction. Therefore, the ejector system, or jet, must be throttled to produce a depression sufficiently below the hopper pressure to entrain the dust. Beyond the point at which the dust is entrained, the dust-laden stream is expanded to approximately atmospheric pressure to enable the dust to be deposited. One form of ejector that is suitable for such operation comprises a venturi tube with a coaxial tapered nozzle which delivers a jet into the throat of the venturi tube while the dust is entrained by the jet in the convergent part of the venturi tube.

In order that the invention may be clearly understood, and readily carried into effect one construction in accordance therewith will now be described, by way of example, with reference to the accompanying drawings, in which:

FIGURE 1 is a section (taken on the line I—I in FIGURE 2) of a cyclone dust extractor diagrammatically shown connected to an internal combustion engine.

FIGURE 2 is a section on the line II—II in FIGURE 1.

A row of three cyclone elements 1 are mounted with their axes parallel to one another on one side of a dust hopper 2, having a rectangular horizontal section. Each cyclone element 1 comprises concentric tubes 3, 4 spaced by helical vanes 5. The inner tubes 4 are connected to supply the air for combustion in a supercharged internal combustion engine E, so that dust laden air is drawn in from the atmosphere between the tubes 3, 4, a swirl being imparted to the air between each pair of tubes 3, 4 by the vanes 5. The momentum of the dust causes it to be carried on through convergent portions 6 of the tubes 3 into the collection hopper 2, to the bottom of which the dust falls.

The hopper 2 converges at its lower end to an elongated outlet slot 7 which opens into the top opening of a cylindrical tube 8 which may be described as the median portion of the ejector means described herein and is formed at a location just beyond the slot 7, with a venturi tube 9. A tapered nozzle 10, terminating at a preselected location just short of the throat 11 of the venturi tube 9, is mounted coaxially with the tubes 8, 9. Reference numeral 8' indicates the inlet end of the ejector means. Air bled from the outlet side of the compressor or, as in FIG. 1, supercharger S through a tube 8a leading to the inlet end 8' of tube 8, is throttled in the constriction formed by the tapered nozzle 10 and the emergent jet entrains dust passing through the slot 7 and carries it through the venturi tube 9. The dust-laden stream is expanded in the divergent or flared part 12 of the venturi tube and delivered through a pipe 13 to a convenient location outside the housing of the engine, which may be an engine house or vehicle.

It has been found that, where the depression in the hopper is eight inches water gauge, the gauge pressure at the inlet end of the nozzle 10 may be six pounds per square inch.

The outlet tube 4 of each cyclone element 1 comprises an untapered section, an outwardly flared section 4a leading into the untapered section, and an outwardly tapered section 4b leading out of the untapered section. The tapered section 4b of the outlet tube 4 is preferably not less than twice the length of the untapered section. The taper is preferably such that the angle included by the taper is seven and a half to eight degrees of arc. This venturi shaped outlet tube 4 reduces the losses that arise as the air vortices are transferred to the tube and discharged through a tube 14 to the supercharger. The tube 14, of course, connects all three cyclones to the supercharger. The blades 5 are such that the air entering the tube 3 encounters the leading edges of the blades at a zero or small angle of incidence, the blades being curved so as to impart to the air, as it travels along the blades to their trailing edges, an increasing component of velocity that is tangential to the tube 3.

It will be seen that the dust hopper 2 is closed except for the dust outlet slot 7 and the dust inlets provided by the convergent portions 6 of the tubes 3. The dust ejector 9, 10, therefore, maintains some depression of air pressure in the hopper 2, so that the cyclone separators have to take all the air to be cleaned through the ends of the tubes 3 remote from the hopper 2, and none from the hopper 2.

Where it is inconvenient to supply the dust ejector with compressed air bled from a supercharger, another source of compressed air may be used. For example, in large motor vehicles it is quite usual to carry compressed air bottles kept filled by motor driven pumps, for the purpose of performing various functions associated with the vehicle.

I claim:
1. Apparatus for extracting dust from a stream of air fed to an internal combustion engine comprising, a plurality of cyclone separators each having inlet means arranged to receive the dust-laden air and first and second outlet means for respectively discharging the separated dust and the clean air, an enclosed collection hopper for receiving the dust, said hopper including a side wall and a base, the side wall having a plurality of openings equal to the number of cyclone separators and spaced above the base and each cyclone separator being mounted respectively in each said opening to dispose the said first outlet means thereof within the interior of the hopper, the hopper having an elongate slot formed in the base thereof, ejector means disposed beneath the base of said hopper and joined thereto, said ejector means comprising an elongate, tubular member having an inlet and, a median portion and a flared outlet end flared to a diameter greater than the diameters of the inlet end and median portion and communicating to the atmosphere, said median portion having an opening in the wall thereof and, at least a section of said opening being in communicating relation with the slot in the base of said hopper, said median portion having means forming a constriction disposed therein at a pre-selected location relative to the slot in the base of the hopper, said pre-selected location being on the outlet side of said median portion and closely adjacent that section of the opening in the wall of the said median section which is in communicating relation with the interior of the ejector means, a source of compressed air including a compressor, conduit means linking the second outlet of said cycline separator with the compressor and bleed means linking the compressor to the inlet end of the ejector means, said bleed means directing a fraction of the clean air from the exhaust side of the compressor in a continuously flowing stream to the inlet end of the ejector means during operation of the apparatus, said stream of clean air being directed along a path taken through the median portion and through the thus formed constriction whereby to maintain an area of decreased pressure differential relative the enclosed hopper and located between that section of the opening in the wall of the median portion of the ejector means which is in communicating relation with the interior of the ejector means and the flared outlet end thereof.

2. The apparatus as described in claim 1 wherein said source of compressed air, including a compressor, comprises a supercharger adapted to be operatively connected to the internal combustion engine, the conduit means communicating with the intake thereof and the bleed means being taken off the exhaust of said super-charger.

3. The apparatus as described in claim 1 wherein the means forming a constriction comprises a tapered, hollow cone joined at its wide end to the inner wall surface of the median portion opening to the inlet end of the ejector means and the narrowest diameter portion of said cone concentrically disposed in the median portion at said pre-selected location therein.

4. The apparatus as described in claim 1 wherein the axis of said ejector means intersects a plane taken normal thereto and through the slot in the hopper base.

5. The apparatus as described in claim 1 in which a Venturi funnel is disposed between the median portion and the flared outlet end delineating the juncture therebetween.

References Cited by the Examiner

UNITED STATES PATENTS

| | | | |
|---|---|---|---|
| 1,513,036 | 10/24 | Donaldson | 55—431 XR |
| 1,539,797 | 5/25 | Chandler et al. | 55—431 XR |
| 1,745,950 | 2/30 | Orem | 55—431 XR |
| 1,867,465 | 7/32 | Moynan | 55—457 |
| 2,150,487 | 3/39 | Brown. | |
| 2,209,339 | 7/40 | Knight | 55—1 |
| 2,225,112 | 12/40 | Hill. | |
| 2,323,708 | 7/43 | Danz | 55—345 |
| 2,391,863 | 1/46 | Bowen | 55—466 XR |
| 2,688,378 | 9/54 | Perrin | 55—396 |
| 2,708,489 | 5/55 | Stokoe | 55—431 XR |
| 2,795,291 | 6/57 | Pierce | 55—293 XR |
| 2,823,656 | 2/58 | Dolza. | |
| 2,911,065 | 11/59 | Yellott et al. | 55—343 XR |
| 2,920,635 | 1/60 | Wilson. | |
| 2,949,902 | 8/60 | Calovolo. | |
| 3,104,962 | 9/63 | Duer | 55—521 |

FOREIGN PATENTS

| | | |
|---|---|---|
| 504,459 | 7/51 | Belgium. |
| 846,368 | 8/52 | Germany. |
| 792,588 | 4/58 | Great Britain. |
| 86,861 | 11/57 | Holland. |

HARRY B. THORNTON, *Primary Examiner.*

ROBERT F. BURNETT, *Examiner.*